(12) United States Patent
Protassov et al.

(10) Patent No.: US 7,941,552 B1
(45) Date of Patent: ***May 10, 2011

(54) SYSTEM AND METHOD FOR PROVIDING SERVICES FOR OFFLINE SERVERS USING THE SAME NETWORK ADDRESS

(75) Inventors: Stanislav S. Protassov, Moscow (RU);
Alexander G. Tormasov, Moscow (RU);
Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 109 days.

This patent is subject to a terminal disclaimer.

(21) Appl. No.: 12/394,005

(22) Filed: Feb. 26, 2009

Related U.S. Application Data

(63) Continuation of application No. 11/132,334, filed on May 19, 2005, now Pat. No. 7,502,861, which is a continuation-in-part of application No. 09/918,031, filed on Jul. 30, 2001, now Pat. No. 7,099,948.

(60) Provisional application No. 60/269,655, filed on Feb. 16, 2001.

(51) Int. Cl.
*G06F 15/177* (2006.01)

(52) U.S. Cl. ............ 709/229; 709/223; 707/10; 707/146

(58) Field of Classification Search .................. 709/223, 709/228, 229
See application file for complete search history.

(56) References Cited

U.S. PATENT DOCUMENTS

| 5,365,606 A | 11/1994 | Brocker et al. |
|---|---|---|
| 2003/0018927 A1 | 1/2003 | Gadir et al. |
| 2004/0093512 A1 | 5/2004 | Sample |
| 2004/0117532 A1 | 6/2004 | Bennett et al. |
| 2005/0120160 A1 | 6/2005 | Plouffe et al. |

OTHER PUBLICATIONS

Search report in Eurasian App. No. 201000263/26.

*Primary Examiner* — Adnan Mirza
(74) *Attorney, Agent, or Firm* — Bardmesser Law Group

(57) ABSTRACT

A system, method and computer program product for controlling virtual servers includes a plurality of virtual servers running on a host computer. An address and a unique identifier can be associated with each virtual server. A control procedure(s) is within each corresponding virtual server, and can be used to control that virtual server in response to control commands. A control interface is outside the virtual servers and can be used for control of the virtual servers in response to control commands. The virtual server can be a Virtual server. The control command can be executable by both the control procedure(s) and the control interface, or can be executable by the control interface if the control procedure(s) is unreachable, or can be executable by the control interface if the virtual server has failed, or can be executable even if the virtual server is inaccessible. The control interface can be accessible by using multiple addresses and identifiers.

21 Claims, 5 Drawing Sheets

SYSTEM AND METHOD FOR PROVIDING SERVICES FOR OFFLINE SERVERS USING THE SAME NETWORK ADDRESS

CROSS-REFERENCE TO RELATED APPLICATIONS

This application is a continuation of U.S. patent application Ser. No. 11/132,334, filed on May 19, 2005, which is a continuation-in-part of U.S. patent application Ser. No. 09/918,031, filed on Jul. 30, 2001, which claims priority to U.S. Provisional Patent Application No. 60/269,655, filed on Feb. 16, 2001, which are both incorporated herein by reference.

BACKGROUND OF THE INVENTION

1. Field of the Invention

The present invention is related to Virtual Servers, and more particularly, to control means for isolated Virtual Servers that appear to a user as a stand-alone server, and more particularly still, to control means for non-responsive or failed Virtual Servers.

2. Description of the Related Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP) (which can be a data center, an IT department, a hosting service, etc.), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer is desirable. In order to be commercially viable, however, every server application needs to be isolated from every other server application running on the same physical host. In that context, a single computer system (usually called a "host") supports multiple virtual servers (e.g., Virtual Private Servers or VPSs), sometimes as many as hundreds or thousands of VPSs.

Many applications involving such virtualization concepts as Virtual Private Servers (VPS) involve the use of VPSs in the context of webservers. Such a VPS therefore has an assigned IP address, and various other parameters associated with a webserver, for example, a URL, a DNS name, etc.

A typical situation where VPSs can be used is a single "box" (in other words, a single computer) located in a data center. The box has a host operating system and a plurality of VPSs (VPS1, VPS 2, VPS3, etc.), each of which appears to the user as a single dedicated webserver. The user is therefore unaware that the VPS is something other than an entire "box" dedicated to that particular user. Typically, each VPS has a control panel, or some other analogous mechanism, through which the user can control the behavior of his VPS. In other words, as an administrator of that VPS, the user has substantial control over the behavior of that VPS, so long as the host operating system permits the actions at issue.

Similarly, the host operating system has its own control panel, which is available to the system administrator to control the various functions of the host as well as to regulate the activities of the various tasks. Normally, the control panel of the host operating system is available to the administrator of the data center, where the VPS is physically located. In actuality, a typical data center can have hundreds or even thousands of such boxes.

Each VPS usually includes a set of processes associated with that VPS and has an address, e.g., host name or IP address, by which a user can establish connections with processes associated with a certain VPS. A VPS can have a control procedures as a common set of procedures. A control procedure is typically required for such things as VPS monitoring, configuration and for controlling the VPS. Each control procedure may be accessed by using an address corresponding to that procedure.

Since the control procedure normally running within the VPS is inaccessible if the VPS is inoperable, the control procedure(s) outside VPS may be used for controlling VPS operation and performance.

The problem with a common approach is that the user needs to use different addresses for establishing connection to the control procedures that in turn depend on the state of the VPS. Such a control procedures cannot be used to investigate whether the VPS is active before establishing the connection. Also, the user has to remember proper address and configuration settings to use such a control procedure, which are often different from what is required for VPS administration itself.

Furthermore, some control or monitoring activities can be performed using either internal or external control interfaces, but the graphical user interface (GUI) can be different, and the user who needs to control the VPS often needs special training, e.g., to be able to choose the proper address not merely based on the VPS condition, but also based on the action required.

Normally, the VPSs communicate with the outside world using I/O ports of the computer, which are connected to some sort of network, such as the internet, a LAN, etc. Each such VPS is associated with an IP address, as noted above, which the outside world uses to access that particular VPS. A problem can arise if for some reason, the VPS should "break," or crash, etc. In the case of a problem with physical hardware, a software resolution of this problem is usually not practical, other than to restart the VPS on a different machine. However, many VPS crashes occur due to activities of the VPS itself—for example, the VPS is affected by a virus, or the user is running code that triggers a VPS crash, etc. That VPS is therefore unavailable to the user trying to access the VPS, because there is nothing responding to the user. Thus, the user has no mechanism to get a crashed VPS to respond to it, and normally has to contact someone at the data center who can restart the VPS manually. This is frequently a problem in that it takes time, data center personnel are not always instantly available, the data center itself may be under-staffed, particularly if the VPS crash occurs at a period of the day when few people are at work at the data center, etc. Thus, for a number of mission-critical, or commercially important applications, this is unacceptable, since a crashed and unresponsive VPS can result in lost sales, poor performance, etc.

Accordingly, what is needed is a system and method for remotely controlling and monitoring a failed VPS, without manual intervention by the data center administrator, and for a convenient method for remotely controlling failed virtual servers.

SUMMARY OF THE INVENTION

Accordingly, the present invention is related to a system and method for providing services for virtual servers using the same network address that substantially obviates one or more of the disadvantages of the related art.

In one aspect, there is provided a system, method and computer program product for controlling virtual private servers, including a plurality of virtual private servers. Each virtual private server has an associated address and a unique identifier. Each virtual private server has an internal control procedures operable within the virtual private server for control of that virtual private server in response to commands sent by a remote user using the address and the unique identifier. An external control interface is operable outside the virtual private servers for control of the virtual private servers in response to the commands sent by the remote user using the address and the unique identifier. If a particular virtual private server is non-responsive, the external control interface can be used to manage that virtual private server using the address and identifier associated with that virtual private server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1A:
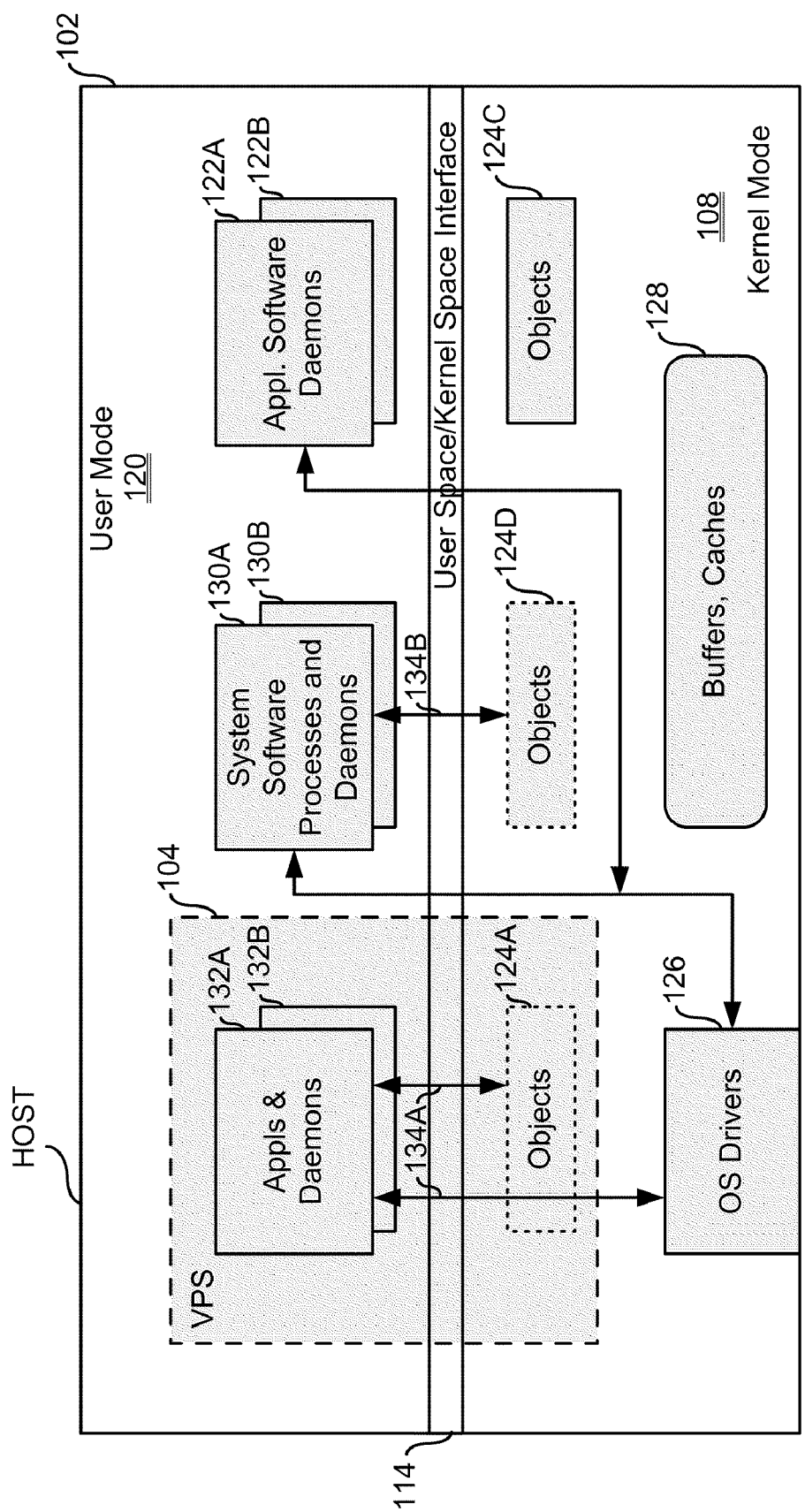
FIGS. 1A-1C show an exemplary VPS system.

Reference will now be made in detail to the embodiments of the present invention, examples of which are illustrated in the accompanying drawings.

The present invention is directed to a system, method and computer program product for managing virtual private servers, such as virtual execution environments or virtual machines running as servers. Since different types of the virtual private servers behave similarly as far as the present invention is concerned, the discussion below will be primarily in terms of Virtual Private Servers.

A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

The approach described herein takes advantage of the fact that the host operating system has a number of mechanisms for monitoring traffic to and from the VPSs. Thus, the VPS user can be provided with tools that reside in the host operating system (in addition to tools that reside within the VPS) for controlling the VPS. Additionally, the approach described herein takes advantage of the fact that usually the host operating system is aware if a particular VPS has crashed, or does not respond to access requests at its designated IP address. The user of the crashed VPS, using the tools provided to him by the host operating system, can restart the VPS himself, without manual intervention by the data center administrator.

The host operating system monitors the network traffic to the VPSs, but normally takes no action with respect to it, since presumably the vast majority of the VPSs are functioning normally. However, if one VPS is "dead" or has crashed, then traffic to that VPS can be intercepted, logged, analyzed, etc. Note also that although in the description above, there is one unique address (e.g. IP address) for one VPS, the present approach also applies to a situation where an IP address is shared among several VPSs.

Another way to frame this approach is to view it as giving the user of the VPS an additional control panel in the host operating system that acts as an intercept layer for incoming traffic. In the event of a VPS crash, the intercept layer can still respond in some fashion to the access request directed to the IP address of the crashed VPS, ensuring that there is "something" at the VPS address that the user can interact with. The intercept layer can also be customized for each VPS, either by the data center administrator or by the VPS user, depending on the minimum functionality desired and the rights that the data center administrator is willing to grant to the user in these circumstances. A fairly basic right is the ability to restart the VPS (something that inherently takes place from "outside" of the VPS). Similarly, VPS shut down can be implemented, using the intercept layer, where the user knows that he can restart the VPS without data center administrator intervention.

For example, the control panel of the VPS can give the user access to such VPS or IP address specific information as access logs and statistics, resource use statistics, control over various applications running within the VPS, passwords, etc. The intercept layer can monitor traffic at the protocol level, for example, identifying the URL to which the traffic is directed, etc. The intercept layer in effect can redirect the access request from a "broken" IP address to its own server, which is guaranteed, in some fashion, to be functional.

Furthermore, the provision of the host operating system level control panel (or intercept layer) such as described above can be implemented for all VPSs for all time, or can be optional (for example, as an extra service provided for a specified fee by the hosting provider, including different levels of service for different sets of commands). In the case of the optional provision of the host operating system level control panel, as described above, it may be activated when there is reason to think that the VPS is more susceptible than usual to crashes or failures, for example, when new code is being tested in that VPS.

It should be noted that identification of the particular VPS that should be controlled via a control means, such as control procedure(s) or a control interface, is an important aspect. Control procedure(s) should be installed in a manner that allows the control procedure to be operable inside VPS to be controlled. The control interface should be installed in a manner that allows the control interface to be operable outside VPS that is being controlled. To accomplish this the control interface can be installed in the host operating system or in another VPS that may be directly supported by hardware system. Without it, the operating system typically will be unable to determine whether a particular action, is, or is not, allowed for that particular VPS. Note that the control procedures and/or the control interface can be resident, or can be started or stopped on demand, e.g., while establishing a transmission channel For example, the control procedures and the control interface can be loaded on demand (i.e., started and stopped) for execution of control commands. After the user closes a control session, the corresponding processes or threads can become inactive. In other words, the user can "exit" control procedures or control interface, or even "kill" it in the Task Manager.

In one embodiment of the virtual private server, the operating system creates a data structure that stores the information corresponding to the VPS, which usually occurs when the VPS itself is created. Some of the information can be stored permanently. For example, the file system can contain a configuration file for each VPS. The data structure also typically includes a number of parameters used for the functioning of the VPS itself. Preferably, there is a quick way of naming the VPSs, such that searching through the data structure can be accomplished rapidly. This can be a VPS ID, which can be, for example, a number, an alphanumeric string, or similar constructs. Those objects that are unambiguously identified as being associated with a particular VPS typically cannot be re-associated with another VPS, since such a possibility usually suggests a concurrent possibility of a security hole. In other words, a process that is "born" in the context of one VPS cannot live in another VPS.

The launch of multiple VPSs in the same host in such a manner permits a high level of hardware server utilization. With effective VPS resource isolation, it is possible to offer a guaranteed level of security and resource availability specified in a service level agreement (SLA).

Thus, a typical application includes a physical computing system or stand alone computer (usually called a "host") that is configured to run multiple isolated Virtual Private Servers (VPSs). The host includes an operating system (OS) kernel. The kernel runs a number of processes and threads for execution of various system related processes. The host also includes a number of processes running on the hardware server that correspond to the VPSs, with typically (but not necessarily) at least one user connected to at least one VPS.

The host can include a physical memory, such as a dynamic random access memory (RAM) used by the various processes and threads. The hardware system can also include various storage elements, such as caches, and operating system buffers. The computer system also includes a central processing unit (CPU), or optionally multiple CPUs, whose time can be shared between and among the VPSs. A number of peripheral devices can be included, such as disk storage devices, input/output interfaces, network interfaces, etc. The storage mechanisms, particularly disk storage, can include data files, databases, metadata storage and various other permanently and temporarily stored data objects.

Generally, as used in this description, the operating system kernel has one or more "processes" running within kernel mode. The operating system itself may be viewed as a process. The OS process has its own objects for its own internal use, as well as a number of objects that are representative of the VPSs supported within it.

Each VPS is therefore a set of processes running in user mode with support from the operating system kernel. Each such VPS typically has a number of users and groups, with objects representative of the users associated with the particular VPS. Also, each VPS typically has a number of processes and threads that correspond to, for example, application software being run by a particular user.

Each VPS can have its own identifier that allows someone, e.g., an administrator, to locate the VPS via a network interface. Examples of such identifiers can be hostnames or URLs or similar "tags." The VPS also includes a number of interfaces that permit the users, including the VPS administrator, to access the various services available on the server and on the kernel. A particular case of such services is remote control, sometimes referred to as "server configuration means." Such interfaces include system calls, shared memory interfaces, I/O driver control (ioctls), and similar mechanisms.

Each VPS typically includes a number of processes, threads, lightweight processes, and other primitives for servicing the users of that particular VPS. Each VPS also typically has its own objects and data structures that are associated with the processes and threads of that particular VPS. Each VPS may also include a number of objects and data structures utilized by the operating system for control of that VPS.

It should be noted that in the general case, VPS processes are fully isolated from each other and cannot affect another VPS's process, although in some cases, a single VPS can support other VPS's within it. Also, a high ranking VPS may implement control and other service functions. Also, the level of isolation between VPSs can be reduced by the host OS or by additional settings.

The VPSs can also be implemented as a software expansion of capabilities of Windows-based servers (i.e., "add-ons"), for example, Microsoft Windows NT servers, Microsoft Windows 2000 servers, Microsoft Windows Server 2003, and various derivatives thereof, by adding the missing isolation mechanisms and VPS resource management mechanisms to the operating system kernels of those operating systems.

Each VPS offers a number of services to users of that VPS, which are implemented as processes within that VPS. From the perspective of the user, the existence of the VPS is transparent, such that to the user it appears that he has an entire remote server dedicated to himself. The present invention provides the possibility to enable some VPS functions even if the VPS itself is inoperable or appears unreachable to the user.

One example of a system where the present invention can be implemented will be further described with reference to FIGS. 1A, 1B and 1C.

Figure 1B:
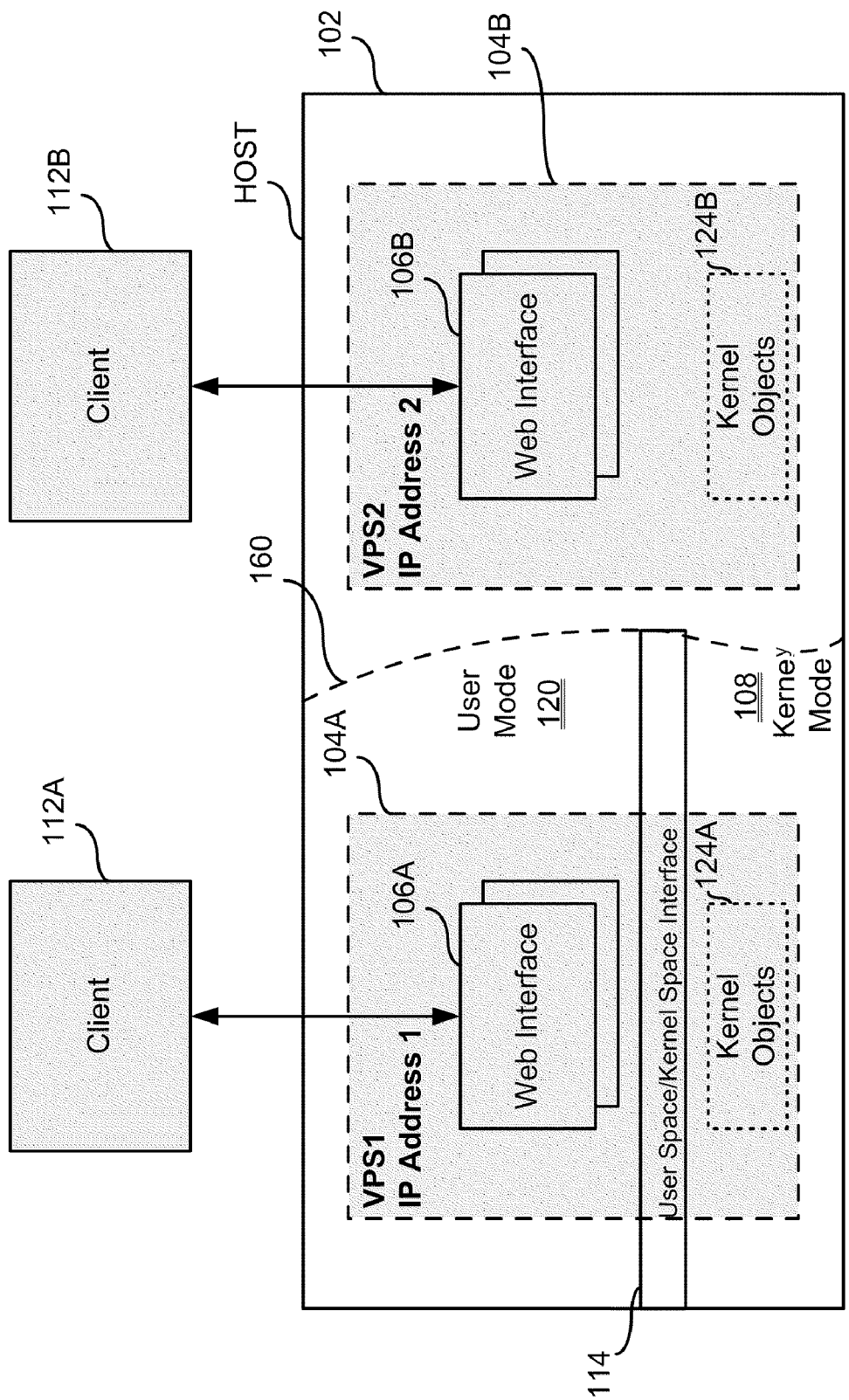
Figure 1C:
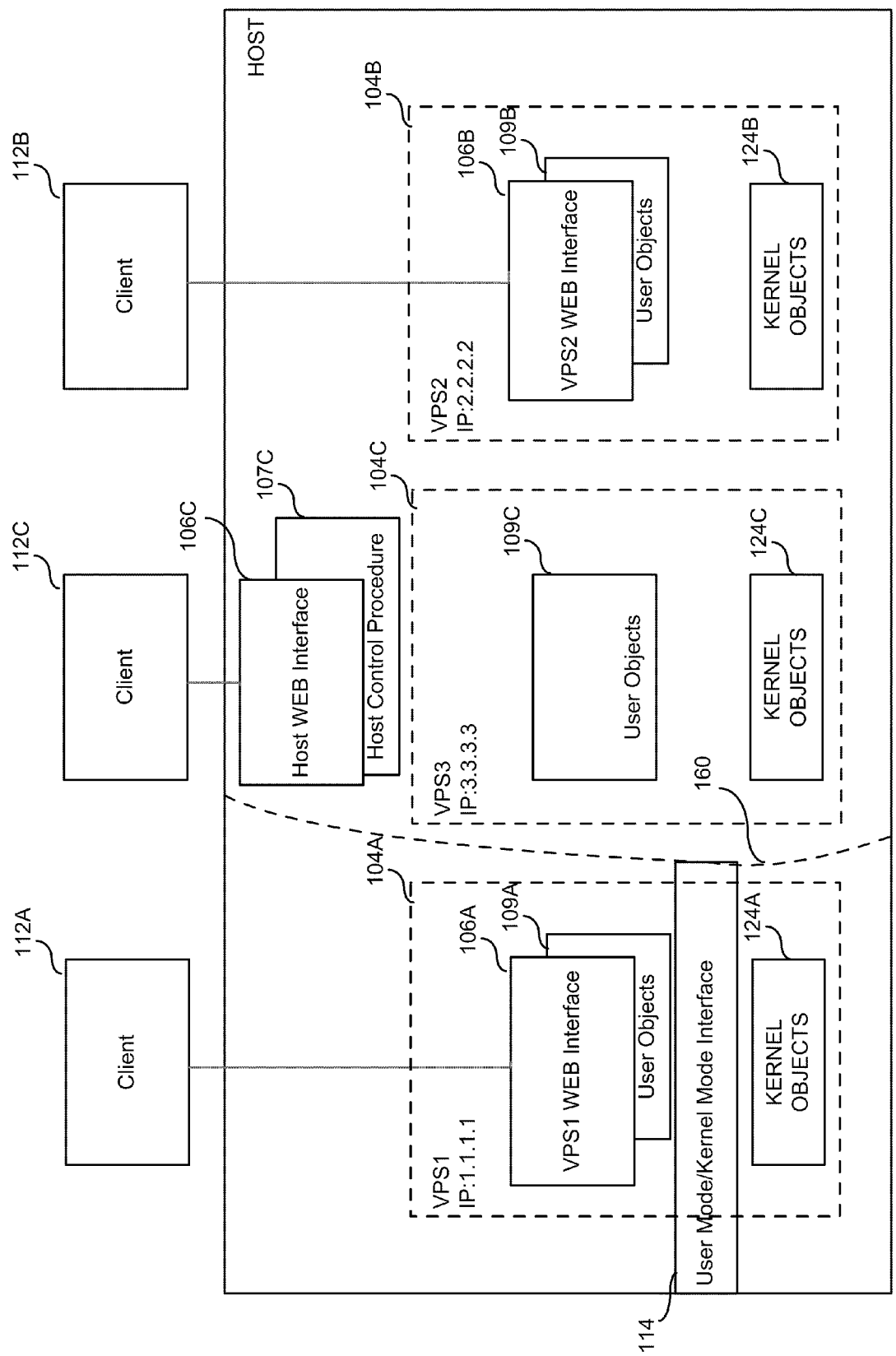

FIG. 1A illustrates a general case of the system with isolation of VPS components, and FIGS. 1B-1C, illustrate examples of the system in a web context wherein virtual private servers may be servers that share some resources or virtual servers with dedicating resources such as servers running with virtual machine monitor support.

As shown in FIG. 1A, a host computing system 102 is running a host operating system with a kernel 108. A VPS 104 (only one is drawn in this figure) typically has a unique address, e.g., its own IP address (although in some cases, the same IP address can be shared by several VPSs). An operating system interface 114 (for example, typically including system calls, I/O controls (ioctls/fcntls), drivers, etc.), is used for communication between user space (user mode) 120 processes and kernel space (kernel mode) 108 processes. In this context, the OS kernel 108 is the protected part of the operating system, typically the part that is essential to the functioning of the host 102. Note also that although only a single host 102 is shown, the invention can also be used with virtual environments running on a computer cluster.

122A, 122B are applications and daemons running in user space 120 of the host OS. The server may include a number of such application programs, system services, daemons, and similar constructs typically utilized by the users (for example, word processors, database software, webpage servers, remote procedure calls, support daemons, Telnet servers, etc.).

124A designates a set of objects associated with a particular VPS. 124D designates a set of objects and data structures associated with operating system software processes. 124C designates a set of objects and structures that are used by the OS kernel 108 itself, for its own purposes. 126 designates operating system drivers, e.g., drivers of the hardware. 128 designates OS kernel buffers, caches, and other similar structures that are used for storage and input/output operations. 130A, 130B are system software processes and daemons running in the user mode. 132A, 132B are applications and daemons that exist in user space 120 of the VPS. The objects and data structures 124A themselves may be created in the user mode 120 by the user mode processes 132A, 132B. Other examples of daemons include, for example, web server daemons that interact with Internet Explorer, RPC port mapper servers (i.e., servers that do not directly interface with users), etc.

134A, 134B designate communications between user space 120 processes and kernel space 108 processes. In one embodiment of the system intended to use the present invention, the isolation between the VPSs 104 is designed at the kernel level, and some of the VPS 104 isolation may be implemented in user space 120.

Additionally, each VPS 104 may have its own set of resources, for example, its own disk space, file space, its own share of common network adapter bandwidths, etc. It will be appreciated that, in reality, any number of VPSs 104 may be running on the host 102, limited only by physical system parameters, CPU speed and system bus bandwidth and other resources limitations.

Each VPS 104 has a share of system resources allocated to it. The resources allocated to each VPS 104 (for example, memory, file space, I/O, etc.) are isolated from each other through the use of a VPS ID and/or specific kind of addressing.

In general, in order to implement the present invention, the address space is divided into two areas: kernel space 108, which is used by the operating system in kernel mode, and is normally not accessible by application software run by the users 112, and a set of virtual address spaces dedicated to user processes, generally referred to as "user space" 120, in which the VPSs 104 and the user applications 132 running in them exist. Each VPS 104 has its own set of addresses used by user processes to access different data locally and across a network. This is done in order to prevent security violations by a VPS 104. Note that some of the VPS functionality can exist in the kernel space 108. Some of the functionality can also exist in the user space 120. In the user space 120, software 130 can support the needs of the operating system kernel. An example of such functionality may be a daemon that gathers statistics about the VPS 104 use. Another example may be a daemon that monitors VPS 104 processes, etc.

As noted above, each VPS 104 has a number of objects associated with it. Such objects are representative of the users 112, corresponding user processes and/or the applications being run within that VPS 104.

As shown in FIG. 1B, the host computing system 102 can run or support multiple VPS's 104A, 104B and 104C (note that 104C is not shown in FIG. 1B), each with their own IP address and/or other identifier (such as a URL or a hostname) that allow user to locate a VPS or establish connection to VPS procedures, e.g., through the web or network software interface 106A, 106B, 106C. Note also that the dashed line 160 indicates that user applications, as well as system utilities, can exist in user space 120, in addition to the system utilities that can exist in kernel space 108.

Also, a user 112 may connect to the host web interface running, e.g., in the user mode (see 106C).

Some VPSs, e.g., 104C, supported by the host 102 may be inoperable due to the software faults, or may be fully inactive and present only in the form of records on storage devices. Crashes can occur accidentally, due to an error in a particular application, or deliberately, when one user attempts a Denial of Service attack. Also, there may be application crashes, webserver crashes and various other failure modes. A badly written script can easily use up significant CPU resources (at times, approaching 100% of the CPU resources), leaving almost nothing for other users. An example of a badly written CGI script is an infinite loop, as follows:

line 1
goto line 1

In an exemplary embodiment, the user 112 can connect to the host web interface 106 using identifiers of any or some of the VPSs, where for the purpose of establishing a proper connection, a unique address is assigned to the VPS. This unique address and identifier is used to create a "transmission channel" in the network, for example, a packet switching network like a TCP/IP network. This transmission channel is established to deliver control commands to the control procedure(s) that is being accessed.

For purposes of illustration, FIG. 1C shows a single control interface 107C outside the VPSs 104 that is external to the VPSs 104 (although the invention is not limited to a single such control interface, and multiple interfaces can also be used). Note that the control interface 107C can be either in user space or in operating system (kernel) space. The control interface 107C is able to check and control at least some VPS conditions and settings as if it were running on a single hardware server corresponding to that VPS. It should be noted that the host operating system may have more then one control interface or control means running within it.

Each VPS 104 can also have its own internal control procedure(s) running inside the VPS 104 to perform monitoring and control functions that themselves can run as a user object 109 or as a kernel object 124.

The VPS's 106A, 106B are connected to users (clients) 112A and 112B, in this case, one client 112 to each VPS 104. Here, the client 112 is an example of a user. Another example of the user 112 may be a VPS administrator. The user (client) 112C is connected to the host web or network interface 106C. The clients 112A and 112C can control objects of the VPSs 104A and 104B respectively from inside VPS's 104A and 104B, and the user 112C may control any VPS based on the established connection or access rights granted to the client 112C.

Figure 2:
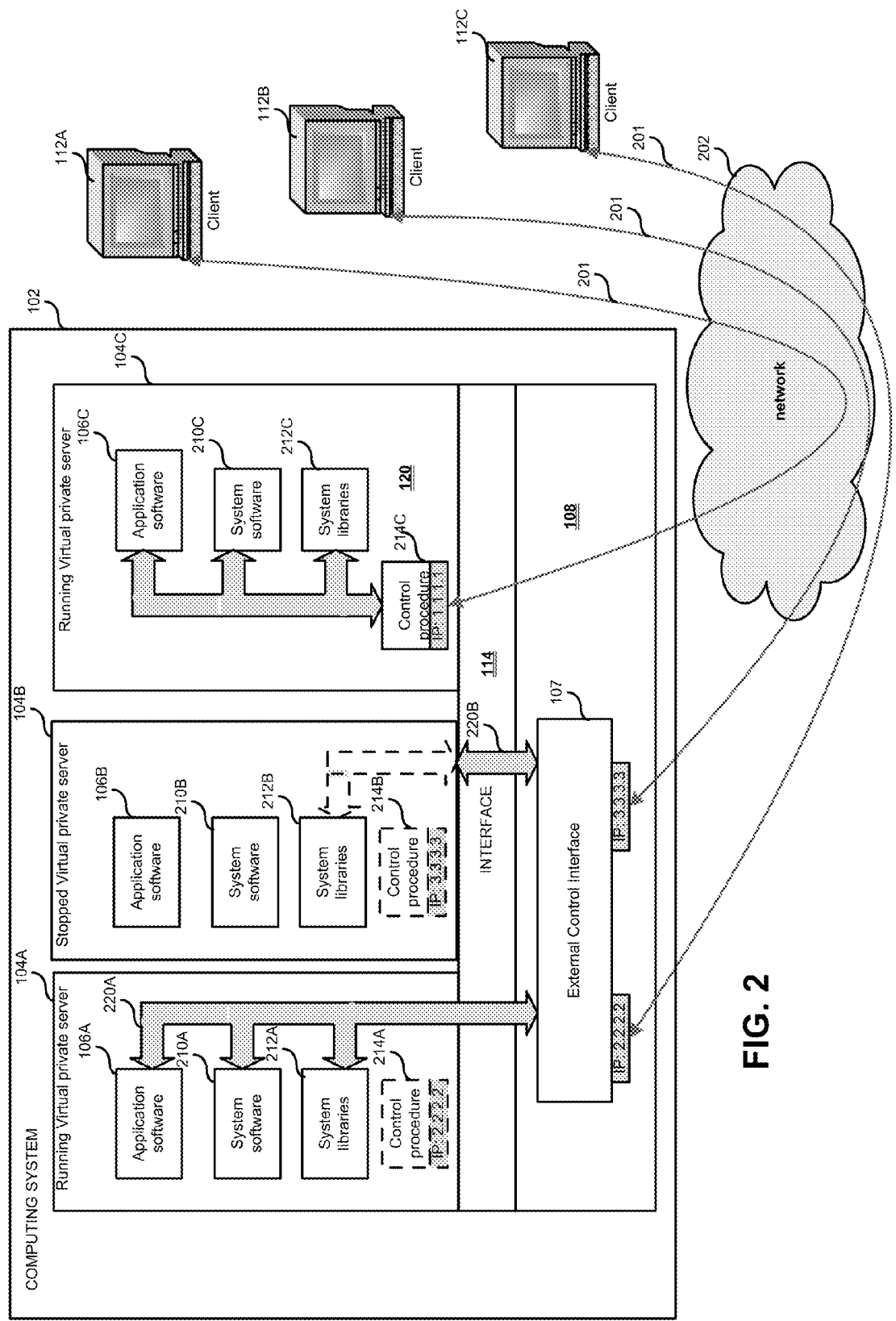
FIG. 2 illustrates an example of accessing the various control means by a client in the context of multiple VPSs.

FIG. 2 illustrates an example of accessing the various control mechanisms by a client in the context of multiple VPSs 104 running on the same server 102. In FIG. 2, 201 designates a communication channel, for example, an Internet 202 link. A plurality of VPSs 104 are running in the host 102. Each VPS 104 has its own application software 106, its own system software 210A, its own system libraries 212, and its own internal control procedure(s) 214. Each VPS 104 typically has its own IP address (although the IP addresses can also be shared). Clients 112 (which can be VPS administrators, authorized users, or non-authorized users, such as anonymous Internet users) use the communication channel 201 to access the VPSs 104. The external control interface 107 (here, shown without the letter designation, indicating that it can work with several VPSs simultaneously), which is located outside the VPSs 104, in kernel space 108, can also be used to manage and control the VPSs 104. The external control interface 107 can communicate with various elements of the VPS 104 using the interface 220. Note that the external control interface 107 can be made available to some users 112 (e.g., 112A, 112B) through, but not to others (e.g., 112C). Note also that the various rights granted to the different users 112 can be different, as shown by the fact that the interface 220A and 220B are connected to different elements of their corresponding VPSs.

The external control interface 107 is intended for solving various kinds of problems related to the VPS 104 functioning. It is more flexible then the internal control procedure(s) 214 due to its ability to work with those VPSs 104 that have crashed. Note that the external control interface 107 can be a set of procedures and programs, for example, each such procedure or program is responsible for a single control parameter. Also, the external control interface 107 can be unique for each VPS 104, or can be common for some of VPSs 104, but not others, or can be common to all VPSs 104.

External control interface 107 functionality, as well as the internal control procedure(s) 214, provides the user 112, such as a VPS administrator, the ability to manage the user's VPS 104 with the help of any standard web browser on any platform. Note also that although the most common scenario occurs when the control interface 107 is used when the particular VPS is unresponsive, while the internal control procedure(s) 214 is used when the VPS is responsive, it is also possible to use the control interface 107 to manage the VPS that is responsive (rather than its internal control procedure(s) 214).

The user 112 is able to manage the user's VPS 104, typically through some form of a GUI that is part of the control interface 107, in any of the following ways:
(a) Start, stop, or reboot the VPS;
(b) Mount and unmount the VPS in the repair mode;
(c) Reinstall the VPS;
(d) Back up and restore the VPS;
(e) Change the VPS root password;
(f) Start, stop, or restart certain services inside the VPS;
(g) View the list of VPS processes and send them signals;
(h) Connect to the VPS by SSH (Secure Shell protocol, a packet-based binary protocol that provides encrypted connections to remote hosts or servers);
(i) View the current resources consumption and resources overusage alerts;
(j) View logs;
(k) Configure the virtual private server;
(l) Install a user application;
(m) Uninstall a user application;
(n) Configure a user application;
(o) Customize the GUI.

There are at least two possible ways to access control to the VPS 104:
1. Using the IP address (or hostname) of the VPS 104 and TCP port of the external control interface 107;
2. Using the IP address (or hostname) and TCP port of the particular VPS 104.

These two methods can be virtually identical regarding the services available to the control procedure(s) 214 inside the VPS 104. For example, if the VPS 104 is unavailable due to internal error or inoperability, the control procedure(s) 214 is also unavailable.

In either case, user 112 has to connect to the internal control procedure(s) 214 using the VPS ID and, optionally, the user's ID and password, to get access rights to the control procedure. For example, the user 112 can use the IP address (or hostname) and TCP port of his VPS 104 by entering the address in the address line of the user's browser, and his credentials (user name and password) to log into the corresponding control procedure(s) 214. After that, the user 112 can typically control and monitor VPS status, e.g., by means of a graphical user interface or simply by sending command lines to the control procedure.

An external control interface or internal control procedure(s) GUI can be incorporated into the external control interface 107 or the internal control procedure(s) 214 respectively, and can be implemented, e.g., by using a web browser, to let the VPS administrator quickly perform all possible tasks through an intuitive navigation system. Also, control commands may be formed by typing, for example, a command line containing control commands and optionally some additional options or keys, for example, a VPS address and unique identifier for the VPS.

GUI pages can have a menu and a status bar and can provide links to other pages where the user 112 can perform various tasks. In one embodiment, all the links are grouped into four groups: VPS Management, VPS Services, Logs and Other, the names of these groups being links themselves. When performing a particular task, the user 112 can first click on the name of the group to open the corresponding dashboard and then choose a task, or the user 112 can select the task at once on the menu under the corresponding group. The links on the menu do the following:

VPS Management: Opens the VPS Management dashboard, where the user 112 can learn more about various VPS management tasks and perform any of them.

Start/Stop VPS: Opens the page where the user 112 can start, stop, or reboot the current VPS 104.

Change Password: Opens the page for changing the VPS root password.

Reinstall: Opens the Reinstall VPS page, where the user 112 can recover the original template files of the VPS 104 in case something went wrong.

Repair Mode: Opens the page where the user 112 can start the VPS 104 in a so-called "repair mode," in order to perform command line checks and fixes.

Backup: Opens the page where the user 112 can manage the VPS 104 backups.

Resources: Opens the page where the user 112 can learn about the current consumption of hardware resources by the user's VPS 104.

VPS Services: Opens the Service Management dashboard, where the user 112 can learn more about various service management tasks and perform any of them.

System Processes: Opens the list of processes running inside the VPS 104 with the opportunity to send various signals to any of them.

Connect to VPS via SSH: Opens an SSH terminal window for connecting to the VPS 104 via SSH.

Logs: Opens the Logs dashboard, where the user 112 can learn more about various logs available for the VPS 104 and view any of them.

Status Changes Opens the list of status changes the VPS104 has recently undergone.

QoS Alerts: Opens the list of alerts of the VPS 104 overusing any hardware resources or coming close to the usage limits imposed on it.

Actions Log: Opens the list of actions the user 112 has recently performed with the current VPS 104.

Help: Opens the help system.

Sign out: Following this link logs the user 112 out of control procedure(s) for certain VPS.

The status bar can include the following elements:

(a) The ID or the host name of the current VPS 104;

(b) The current state of the VPS 104;

(c) The percent of the available disk space used by the VPS 104.

Status modes monitored and displayed with the control means can be as follows:

Running: The VPS 104 is running; therefore, it can only be rebooted or stopped.

Down: The VPS 104 is stopped; therefore, it can only be started.

Under repair: The VPS 104 is being repaired. The user 112 cannot perform any action on the VPS 104 until the user 112 presses the Finish Repair button on the Repair Mode page.

In addition to these states, a VPS 104 can be in one of the transitional states: mounting, mounted, starting, stopping, etc. When in a transitional state, the user 112 cannot, in a safe manner, perform any action on the VPS 104 until the transitional state has ended. The description of all possible VPS statuses is provided in the VPS Status section.

To view details on the resources consumption, the user 112 can follow the corresponding link to display the current consumption of specific resources by the user's VPS 104. The possible page of interest can be a System Processes page. This page may reflect which process(es) are running inside the VPS 104 so the user 112 can control the processes, particularly those processes that cause problems while the VPS 104 is running. For example, the user 112 might want to terminate or kill the offending process. Otherwise, the system performance can continue to be low for a long time. The System Processes may be displayed, e.g., in the form of a table reflecting all the running processes inside the VPS 104. The table can provide the following information:

(a) The process ID;

(b) The absolute priority of the process assigned to it by the process scheduler. The range can be, e.g., from 0 (the highest priority) to 39 (the lowest priority). The normal process priority is 30;

(c) The relative priority of the process assigned to it by the user 112. A negative value means that the user 112 has manually increased the priority, a positive value means that he decreased it;

(d) The size of physical memory the process really uses (in Kilobytes).

(e) The state of the process. The possible states may be, for example: R—runnable, on the run queue; S—sleeping; T—traced or stopped; D—uninterruptible sleep; Z—defunct, "zombie". If two letters are shown, the second letter means the following: W—has no resident pages; <-high-priority process; N—low-priority task; L—has pages locked in memory;

(f) The percent of CPU time the process is currently using;

(g) The percent of the RAM size the process is currently using;

(h) The total amount of CPU time the process has used so far;

(i) The command that is used to launch the process.

As shown in FIG. 2, a user application or a client 112 calls the external control interface 107, via the physical network 202, to execute a control command (e.g., kill the process inside the VPS 104). Since the VPS 104 represents a fully functioning OS, such a mechanism, e.g., Task Manager, can be called remotely using the VPS IP address and a corresponding login and password, that grants administrator's rights to the user 112.

As noted above, each VPS 104 has a share of system resources allocated to it. The resources allocated to each VPS 104 (for example, memory, file space, I/O, etc.) can be isolated from each other through the use of a VPS ID and other specific kind of addressing.

In such a manner, the process can be "killed" safely as far as other VPSs are concerned, since only the process corresponding to a particular VPS 104 instance will be "killed" inside the VPS 104. If the process causes the VPS's operating system to be unstable or unreachable, the simple access to the host 112 operating system does not resolve the problem of handling this process, since different VPSs can use different instances of the same process. In such a case, a control mechanism is created outside VPS 104 to provide access to VPS applications and libraries using a common set of identifiers with the VPS 104 being controlled.

Thus, in the preferred approach, the control interface 107 outside the VPS 104 (which itself can be one or several procedures or modules) can control or check internal objects and data structures in a safe manner. The external control interface 107 can be unique for a particular VPS 104, or can be associated with a number of different VPSs 104 simultaneously. (For example, the usage of different IDs or IP addresses grants access to different VPS settings).

It should be noted that the host operating system kernel 108, when servicing a user's call, must be able to work with a representation of an object within the dedicated VPS 104 defined by the VPS's unique identifier.

In one embodiment, a unique identifier, such as a URL or a hostname, is used for assigning an address of the VPS 104. A typical example of such an address is an IP address of the webserver (or DNS) name, or network SMB name in MS Network context, used for access of MS Windows shared resources, or a telnet server address, used for interactive login. When choosing a particular address, the user 112 must be certain that he will be accessing the server associated with that IP address, and no other, and that someone trying an address that does not belong to that VPS 104 will not be accessing that VPS 104.

Another example of VPS identification is the credentials necessary for system login and authentication. In that case, even after entering a login using the common IP for different VPSs 104, the user 112 will only be authenticated for that VPS 104, where he is registered as a user.

The VPS functionality for each VPS 104 typically includes creation of a corresponding file structure and files to be used by the VPS 104. These can include, e.g., administrative files, user files, etc. Information relating to the particular VPS 104 is registered in a registration database and various other similar structures maintained by the operating system. This information is intended to enable continued functioning of the VPS 104. Additionally, each VPS 104 may be allocated its own IP address or group of IP addresses and other network resources.

The VPS ID discussed above can be similar to a mark or a handle, or a similar identifier or data structure that can be used for VPS 104 tracking. Thus, the access to VPS 104 and to objects associated with that VPS 104 via control means may be realized by use of VPS ID or VPS IP address.

Although the description above is in terms of a single host 102 running multiple VPSs 104, the invention is equally applicable to a server cluster, where multiple hosts 102 are tied together. Also, the present invention is applicable to any type of server, for example, a web server, a LAN server, a WAN, an intranet server, etc.

Figure 3:
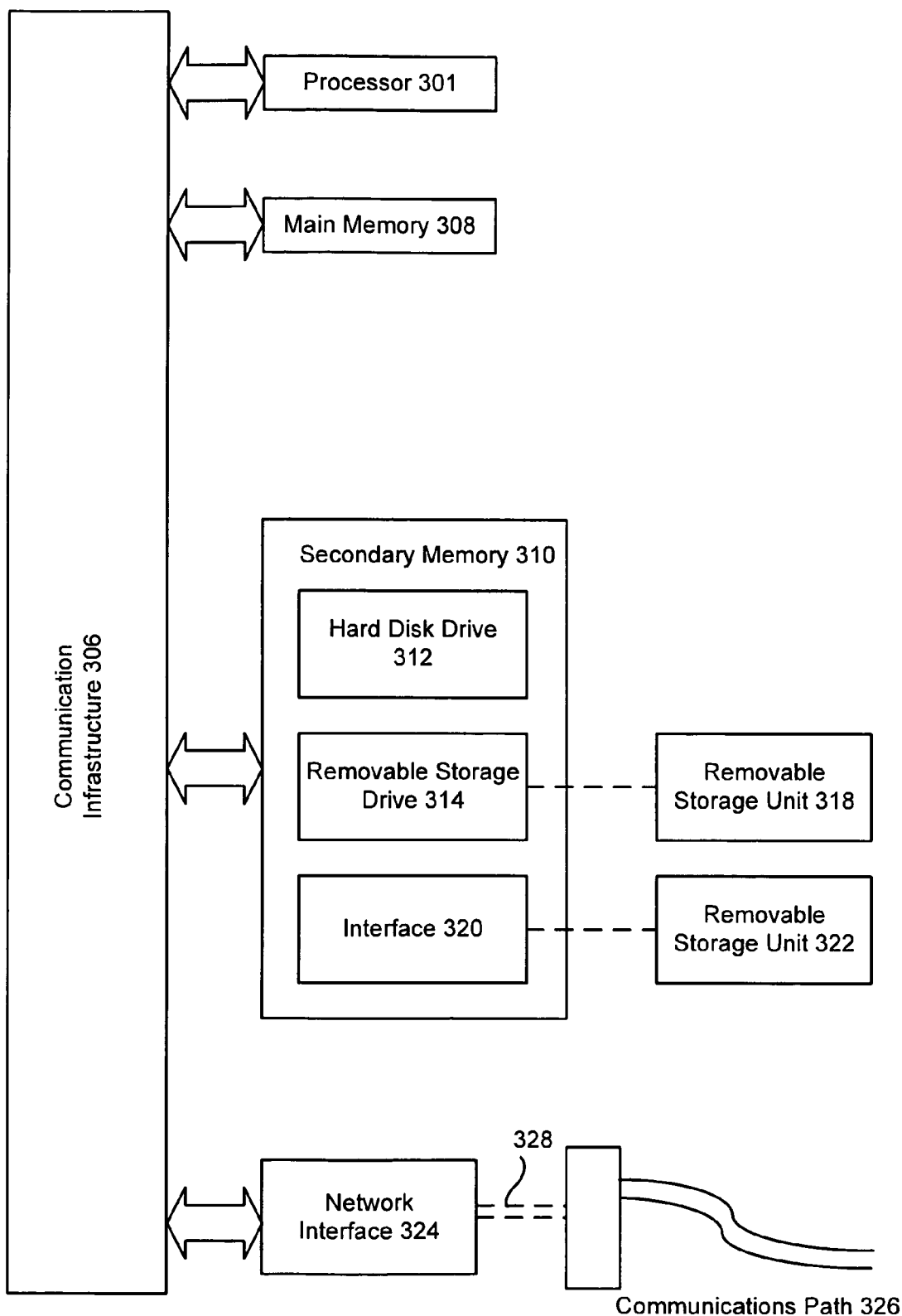
FIG. 3 is a schematic diagram of an exemplary computer or server that can be used in the invention.

An example of the host 102 is illustrated in FIG. 3. The host 102 includes one or more processors, such as processor 301. The processor 301 is connected to a communication infrastructure 306, such as a bus or network). Various software implementations are described in terms of this exemplary computer system. After reading this description, it will become apparent to a person skilled in the relevant art how to implement the invention using other computer systems and/or computer architectures.

Host 102 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into host 102. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to host 102.

Host 102 may also include one or more communications interfaces, such as communications interface 324. Communications interface 324 allows software and data to be transferred between host 102 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the host 102.

Computer programs are stored in main memory 308 and/or secondary memory 310. Computer programs may also be received via communications interface 324. Such computer programs, when executed, enable the host 102 to implement the present invention as discussed herein. In particular, the computer programs, when executed, enable the processor 301 to implement the present invention. Where the invention is implemented using software, the software may be stored in a computer program product and loaded into host 102 using removable storage drive 314, hard drive 312 or communications interface 324.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for controlling virtual servers comprising:
 a plurality of virtual servers running on a single host computer system and sharing a single instance of a host operating system, each virtual server having an associated address and a unique identifier;
 each virtual server responding to requests from clients;
 each virtual server including an internal control procedure for control of that virtual server; and
 an external control interface running on the host computer system and operable outside the virtual server for control of the virtual server in response to commands sent by a remote user using the address and the unique identifier,
 wherein, if a particular virtual server is non-responsive, the external control interface can be used to manage that virtual server using the address and the unique identifier associated with that virtual server.

2. The system of claim 1, wherein the commands are executable by both the control procedure and the external control interface.

3. The system of claim 2, wherein the commands are executed by the control interface when the control procedure is unreachable.

4. The system of claim 3, wherein the commands are executed by the external control interface when the virtual server has failed.

5. The system of claim 1, wherein the control interface is accessible using multiple addresses.

6. The system of claim 1, wherein the commands are used to control user applications running in at least one of the virtual servers.

7. The system of claim 1, wherein the address is a hostname.

8. The system of claim 1, wherein the command comprises any of:
 start/stop the virtual server;
 change the virtual server passwords;
 reinstall the virtual server;
 repair the virtual server;
 backup the virtual server;
 update parameters of a level of the consumption of resources;
 process control commands for the virtual server;
 check status of the virtual server;
 configure the virtual server;
 installing user application;
 uninstalling user application; and
 configuring user application.

9. The system of claim 1, wherein the virtual servers are supported by the same host OS kernel.

10. The system of claim 1, wherein the control interface is activated upon failure of any of the virtual servers.

11. The system of claim 1, wherein the internal control procedure is activated in response to commands sent by a remote user using the address and the unique identifier.

12. A method of managing virtual servers, comprising:
- launching a plurality of virtual servers on a single host computer system and sharing a single instance of a host operating system, each virtual server responding to requests from clients;
- assigning an address and a unique identifier to each virtual server;
- starting, outside the plurality of virtual servers, a control interface running on the host computer system and accessible to a remote user;
- starting, in each virtual server, an internal control program for managing that virtual server;
- setting up a control command execution policy that defines whether (a) the internal control program or (b) an external control interface manages that virtual server;
- receiving a command from the remote user; and
- based on the command execution policy, managing that virtual server by executing the control command in one of (a) the internal control program of that virtual server using the address and the unique identifier associated with that virtual server, and (b) the external control interface using the address and the unique identifier associated with that virtual server,
- wherein selection of (a) or (b) is transparent to the remote user.

13. The method of claim 12, wherein the command is executable when the virtual server is inaccessible.

14. The method of claim 12, wherein the control interface is accessible using multiple addresses.

15. The method of claim 12, wherein the control interface and the control program use the same identifiers, and the external control interface is available when any internal control program is unavailable.

16. The method of claim 12, wherein execution of the control command depends on a state of the virtual servers.

17. The method of claim 12, wherein the control interface is activated upon failure of any of the virtual servers.

18. The method of claim 14, wherein the external control program is activated upon a request from the user.

19. A computer program product for managing virtual servers, the computer program product comprising a non-transitory computer useable storage medium having computer program logic recorded thereon for controlling at least one processor, the computer program logic comprising code for executing the method of claim 12.

20. A computer-implemented method of managing a virtual server, comprising:
- on a computer having a processor and a memory, assigning a unique identifier to the virtual server, wherein the virtual server virtualizes a host computer and responds to requests from clients; assigning an address to the virtual server;
- installing an internal control procedure inside the virtual server for managing, in response to a user command, that virtual server; installing an external control interface on the host computer, operable outside the virtual server, for managing, in response to the user command, the virtual server; receiving the user command from a remote user; selecting one of (a) the external control interface and (b) the internal control procedures for managing the virtual servers; and managing the virtual server based on the command, wherein selection of one of (a) the external control interface and (b) the internal control procedure is transparent to the remote user.

21. The method of claim 20, further comprising establishing, using the address, a transmission channel between the remote user and one of the control interface and the control procedures.

* * * * *